United States Patent [19]
Yamaguchi et al.

[11] 3,977,366
[45] Aug. 31, 1976

[54] INTAKE SYSTEM OF INTERNAL COMBUSTION ENGINE

[75] Inventors: Shunzo Yamaguchi, Nishio; Kenzi Iwamoto, Okazaki, both of Japan

[73] Assignee: Nippon Soken, Inc., Nishio, Japan

[22] Filed: July 23, 1974

[21] Appl. No.: 491,127

[30] Foreign Application Priority Data
July 24, 1973 Japan................................ 48-83813

[52] U.S. Cl. ................................ 123/3; 123/32 SP; 123/122 A; 123/127; 123/75 B
[51] Int. Cl.² ................................ F02M 25/06
[58] Field of Search........ 123/1 A, 3, 122 R, 122 A, 123/122 AA, 122 G, 75 B, 127, 119 E, DIG. 12, 32 SP; 48/212

[56] References Cited
UNITED STATES PATENTS

| | | | |
|---|---|---|---|
| 1,717,767 | 7/1929 | Diaz........................................ | 123/3 |
| 2,201,965 | 5/1940 | Cook........................................ | 123/3 |
| 3,092,088 | 6/1963 | Goosak et al. ...................... | 123/32 SP |
| 3,543,736 | 12/1970 | Suzuhi et al. ...................... | 123/122 A |
| 3,659,564 | 5/1972 | Suzuhi et al. ...................... | 123/32 SP |
| 3,754,870 | 8/1973 | Carnahan............................... | 123/3 |
| 3,828,736 | 8/1974 | Koch....................................... | 123/3 |
| 3,832,984 | 9/1974 | Taguchi.............................. | 123/32 SP |
| 3,853,097 | 12/1974 | Kume................................. | 123/32 SP |

*Primary Examiner*—Wendell E. Burns
*Assistant Examiner*—David D. Reynolds
*Attorney, Agent, or Firm*—Cushman, Darby & Cushman

[57] ABSTRACT

An intake system for intercommunicating a carburetor and a combustion chamber of internal combustion engines which has a cylinder head, an intake port provided in the cylinder head, an intake valve located in the intake port and an exhaust manifold communicated with the combustion chamber. At least two intake passages are provided to join together at that part in the intake port which is immediately before the intake valve. One of the intake passages passes through the exhaust manifold, whereby the atomized fuel particles in an air-fuel mixture to be sucked in the combustion chamber can be positively vaporized without accompanying high temperature rising of the mixture.

7 Claims, 7 Drawing Figures

INTAKE SYSTEM OF INTERNAL COMBUSTION ENGINE

BACKGROUND OF THE INVENTION

The present invention relates generally to an intake system intercommunicating a carburetor or carburetors and a combustion chamber or chambers of internal combustion engines, and more particularly to an improvement of an intake system for ensuring the complete combustion of the mixture fed from the carburetors.

In the conventional intake systems of the internal combustion engines, one intake manifold whose one end is connected to the carburetor is branched depending upon the number of cylinders of an internal combustion engine to be communicated with them so that the air-fuel mixture may be charged into the combustion chambers. A part of the intake manifold is exposed to the exhaust gases or cooling water so that the vaporization of the atomized fuel particles in the mixture may be facilitated. In this conventional arrangement, the heat of the exhaust gases or cooling water is indirectly transferred to the mixture traveling through the intake manifold so that the atomized fuel particles in the mixture are not efficiently vaporized. As a result, when the engine is started so that the temperature of the exhaust gases or cooling water is low, liquid fuel is charged into the combustion chambers. Therefore, the distribution among the combustion chambers or cylinders of a multicylinder engine is not satisfactory, and the engine operation is adversely affected when the engine is accelerated or decelerated. In some cases, the very rich mixture must be fed in order to restore the normal engine operation, thus resulting in the discharge of exhaust gases in large quantity. There has been also proposed to install the whole intake manifold within the exhaust manifold so that the mixture flowing through the intake manifold may be highly heated, but this arrangement has a distinct defect that the mixture is overheated in case of the engine operation under a heavy load, resulting in the decrease in engine output. In order to ensure the optimum engine operation, the temperature of the mixture charged into the combustion chambers must not be so high, and the atomized fuel particles in the mixture must be completely vaporized. However, any prior art intake systems cannot satisfactorily solve these problems.

SUMMARY OF THE INVENTION

One of the objects of the present invention is to provide an improved intake system in which a carburetor or carburetors and combustion chambers are intercommunicated by at least two intake passages which are joined to each other immediately before the intake valves in the intake ports so that the atomized fuel particles in the mixtures may be positively and completely vaporized while the temperature of the final or overall mixture consisting of the mixtures fed through at least two intake passages may be prevented from being raised too high.

Another object of the present invention is to provide a novel intake system in which a body of catalyst is interposed in a part of the intake passage passing through the exhaust manifold so that the quick, positive and complete evaporation of the atomized fuel particles in the mixture may be ensured.

A further object of the present invention is to provide an improved intake system in which the mixtures fed through the intake passages into the combustion chambers are controlled in response to, for instance, the temperature of the overall mixture to be fed into the combustion chambers, so that the positive and complete evaporation of the atomized fuel particles in the mixture may be ensured and the over-heating of the overall mixture may be positively prevented.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1:
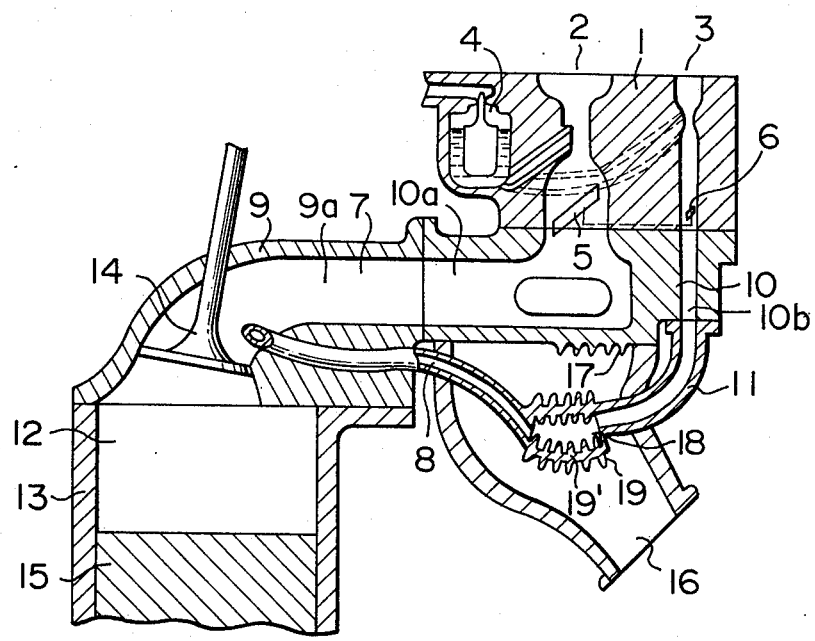
FIG. 1 is a sectional view of a first embodiment of the present invention.
Figure 2:
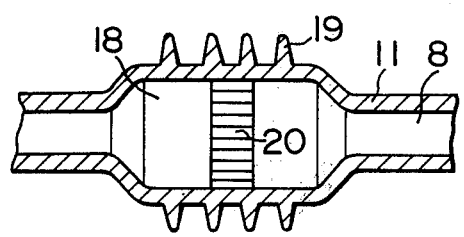
FIG. 2 is a sectional view of an evaporation chamber of a second embodiment of the present invention.

First Embodiment, FIG. 1

Referring to FIG. 1, a compound carburetor 1 comprises a main carburetor 2 and an auxiliary carburetor 3, and fuel or gasoline is stored in a float chamber 4. Both the main and auxiliary carburetors 2 and 3 are of the conventional construction for atomizing and vaporizing the fuel and mixing it with the air in varying proportions to suit the changing operating conditions of an internal combustion engine, but the main carburetor 2 is adapted to provide the lean or thin air-fuel mixture containing relatively large quantity of air while the auxiliary carburetor 3 to provide the rich air-fuel mixture containing relatively a large quantity of fuel. The air-fuel ratios and the amounts of the mixtures provided by the main and auxiliary carburetors 2 and 3 are so determined that when they are mixed together, the mixture suited to the normal engine operating conditions may be produced. Throttle valves 5 and 6 of the main and auxiliary carburetors 2 and 3 are operatively interlocked to each other and coupled to an accelerator pedal (not shown). A main intake passage 7 has one end connected to the main carburetor 2 and the other end connected to a combustion chamber 12 so as to feed the lean mixture to the latter. In like manner, an auxiliary intake passage 8 intercommunicates between the auxiliary carburetor 3 and the combustion chamber 12 via the main intake passage 7 so as to feed the rich mixture into the combustion chamber 12. The main intake passage 7 consists of a main passage 10a in an intake manifold 10 intercommunicating between the compound carburetor 1 and a cylinder head 9 of the internal combustion engine, and an intake port 9a within the cylinder head 9. The auxiliary intake passage 8 consists of an auxiliary passage 10b within the intake manifold 10, and a pipe 11, one end of which is connected to the intake manifold 10. The main intake passage 7 has a cross sectional area larger than that of the auxiliary intake passage 8. The combustion chamber 12 is defined within a cylinder 13, and an intake valve 14 is located in the intake port 9a. The combustion chamber 12 is communicated with the intake port 9a which is a part of the main intake passage 7, and the intake valve 14 is located at the connection between the combustion chamber 12 and the intake port 9a. A piston 15 fitted into the cylinder 13 makes the reciprocal motion in a manner well known in the art. The reciprocal motion of the piston 15 is translated into the rotation in the well known manner, and is also transmitted to the intake valve 14 so as to open and close it. In case of a multi-cylinder engine, a plurality of combustion chambers 12 are provided, and a plurality of main intake passages 7 are branched at the downstream of the main carburetor 2 from the main passage 10a and communicated with the combustion chambers 12 through the intake ports. An exhaust pipe or manifold 16 is communicated with the combustion chamber 12 or a plurality of combustion chambers 12 in case of a multi-cylinder engine through branches (not shown) for discharging the exhaust gas into the surrounding atmosphere. An exhaust valve (not shown) is positioned at the interconnection between the exhaust manifold 16 and the combustion chamber, and is operated in response to the reciprocal motion of the piston 15. A part of the main passage 10a in the intake manifold 10 is exposed to the exhaust manifold 16, and is provided with heat-exchanging fins 17. The pipe 11 which is a part of the auxiliary intake passage extends through the exhaust manifolded 16 and the cylinder head 9 of the internal combustion engine, and has the other end opened into the intake port 9a at a position immediately before the intake valve 14, so that the auxiliary intake passage 8 is joined to the main intake passage 7 to feed the mixtures into the combustion chamber 12 through the intake valve 14. A part of the pipe 11 extending through the exhaust manifold 16 is expanded in the form of a box so as to define an evaporation chamber 18 having a relatively large volume, and both the outer and inner wall surfaces of the evaporation chamber 18 are provided with heat-exhanging fins 19 and 19', respectively. Alternatively, a separate evaporation chamber 18 may be disposed and communicated with the pipe 11. In case of the multi-cylinder engine, the auxiliary intake passage 8 is also branched preferably at the downstream of the evaporation chamber 18.

In the intake stroke of the internal combustion engine, the intake valve 14 is opened so that the lean mixture produced in the main carburetor 2 is forced into the combustion chamber 12 through the main intake passage 7 while the rich mixture produced in the auxiliary carburetor 3 is forced into the combustion chamber 12 through the auxiliary intake passage 8. The mixture forced into the combustion chamber 12 is ignited by an ignition plug (not shown), and exploded, and the high temperature exhaust gases or combustion products are discharged through the exhaust manifold 16 into the surrounding atmosphere. The mixtures produced by the main and auxiliary carburetors 2 and 3 contain the mixture of atomized fuel, which is liquid, and air, which is gas. However, when they are forced into the combustion chamber 12 through the intake passages 7 and 8 without the liquid fuel being vaporized, the combustion is adversely affected.

According to the present invention, the lean mixture flowing from the main carburetor 2 through the main intake passage 7 is heated by the exhaust gases because a part of the intake manifold 10 is exposed to the exhaust manifold 16. The quantity of heat transferred to the lean mixture is relatively small, but the atomized fuel is easily vaporized because the mixture is lean. The atomized fuel is vaporized when the lean mixture is heated at a temperature even less than 50°C. The fins 17 serves to facilitate the evaporation of the atomized fuel. The rich mixture flowing from the auxiliary carburetor 3 through the auxiliary intake passage 8 is considerably heated within the evaporation chamber 18 located within the exhaust manifold 16. Since the quantity of the rich mixture is relatively less, the rich mixture is easily heated to a temperature higher than about 100°C so that the atomized fuel in the rich mixture may be positively and completely evaporated. The fins 19 and 19' serve to facilitate this evaporation. In case of the rich mixture, the atomized fuel tends to turn into droplets and adhere to the wall surfaces of the intake passage. However, according to the present invention, the rich mixture is considerably heated so that the atomized fuel particles may be positively and completely evaporated. Consequently, the fuel and air may be uniformly mixed in gas phase so that the adhesion of the liquid fuel to the wall of the intake passage may be substantially prevented. In case of a multicylinder engine, the uniform distribution of the fuel-air mixture into a plurality of cylinders or combustion chambers may be ensured while the variation in fuel-air ratio of the mixtures charged into the cylinders may be prevented. In general, in case of the transision such as acceleration, a large quantity of fuel is instantaneously fed by an acceleration pump (not shown). According to the present invention, the atomized fuel particles may be immediately evaporated so that the response with which the mixture is charged into the combustion chamber may be improved and the positive engine operation may be ensured. The same is true for the lean mixture charged through the main intake passage 7. The uniformly mixed lean and rich mixtures are further uniformly mixed in the intake port 9a immediately before the intake valve so that the mixture with the optimum air-fuel ratio may be charged into the combustion chamber 12. The charged mixture is exploded as it is ignited by the ignition plug. Since the uniform mixture, in which the atomized fuel particles are completely evaporated, is ignited, the optimum combustion may be ensured. Only the rich mixture is highly heated by the exhaust gases while the lean mixture is not so strongly heated so that the evaporation of the atomized fuel particles in the mixture may be carried out most efficiently and that the overheating of the overall mixture may be prevented. Therefore, the drop in engine output may be positively prevented.

The ratio between the cross sectional areas of the main and auxiliary intake passages 7 and 8, i.e. the ratio between the quantities of lean and rich mixtures may be determined depending upon the air-fuel ratios of the two mixtures and the temperatures of the mixtures heated by the exhaust gases. However, when the volume of the rich mixture is large, the temperature of the overall mixture may be of course raised.

In the first embodiment, the lean and rich mixtures are mixed immediately before it is charged into the combustion chamber so that the optimum evaporation of the atomized fuel particles may be ensured. However, it should be noted that even when the mixtures of the same fuel-air ratio are produced by the main and auxiliary carburetors 2 and 3, the same effects as described above may be attained. In the first embodiment, the evaporation chamber 18, which is a part of the auxiliary intake passage 8, has been described as being located within the exhaust manifold so as to efficiently evaporate the atomized fuel particles, but it is to be understood that the evaporation chamber 18 may be eliminated while only the pipe 11 is extended through the exhaust manifold 16. Furthermore, the fins 17, 19 and 19' may be eliminated.

Second Embodiment, FIGS. 2-5

Figure 4:
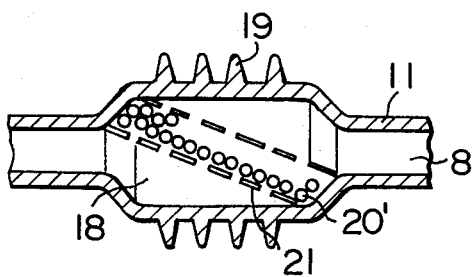
FIGS. 3, 4 and 5 are sectional views of modifications of the second embodiment shown in FIG. 2.
Figure 3:
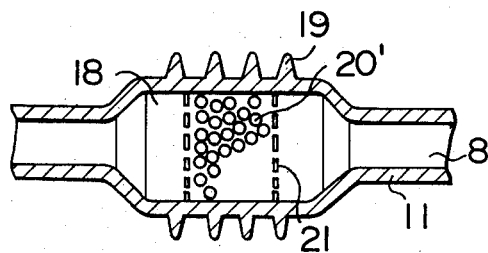
Figure 5:
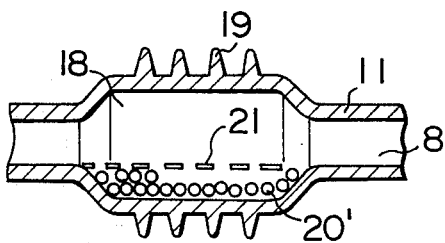

The second embodiment of the present invention is substantially similar in construction to the first embodiment except that a catalyst is placed within the evaporation chamber 18. In the second embodiment shown in FIG. 2, within the evaporation chamber 18 is disposed a honey-comb shaped oxidation catalyst 20 consisting of a honey-comb shaped catalyst carrier having a plurality of axial passages and an oxidizing catalystic metal such as platinum carried by the carrier. Alternatively, the catalyst may be carried by a wire gauze. In the modifications shown in FIGS. 3, 4 and 5, oxidation catalyst particles 20' are used. When the honey-comb catalyst 20 is used, its outer periphery may be attached to the inner wall of the evaporation chamber 18 (See FIG. 2). When the catalyst particles 20' are used, a cage or case 21 having walls provided with a plurality of small holes may be provided within the evaporation chamber 18 (See FIGS. 3–6) for confining the catalyst particles 20' therein. The cage may be made of wire gauze or punched metal sheets 21. The cage 21 may be dispoed at right angles relative to the flow of the mixture as shown in FIG. 3; or may be inclined as shown in FIG. 4; or may be disposed in parallel with the flow of the mixture as shown in FIG. 5. Depending upon the requirements, suitable catalyst, i.e. honey-comb-shaped catalyst 20 or catalyst particles 20' and the arrangement of the cage 21 may be suitably selected.

The oxidation catalyst 20 or 20' placed within the evaporation chamber 18 of the auxiliary intake passage 8 is heated by the exhaust gases to an activated temperature (about 250°C) so that the fuel particles in the mixture reacts with oxygen in air under the catalystic action of the catalyst 20 or 20', with the result in the generation of heat. Consequently, the remaining mixture is heated not only by the exhaust gases but also by the heat of reaction so that the quick, positive and complete evaporation of the fuel particles in the mixture passing through the evaporation chamber 18 may be ensured.

Figure 6:
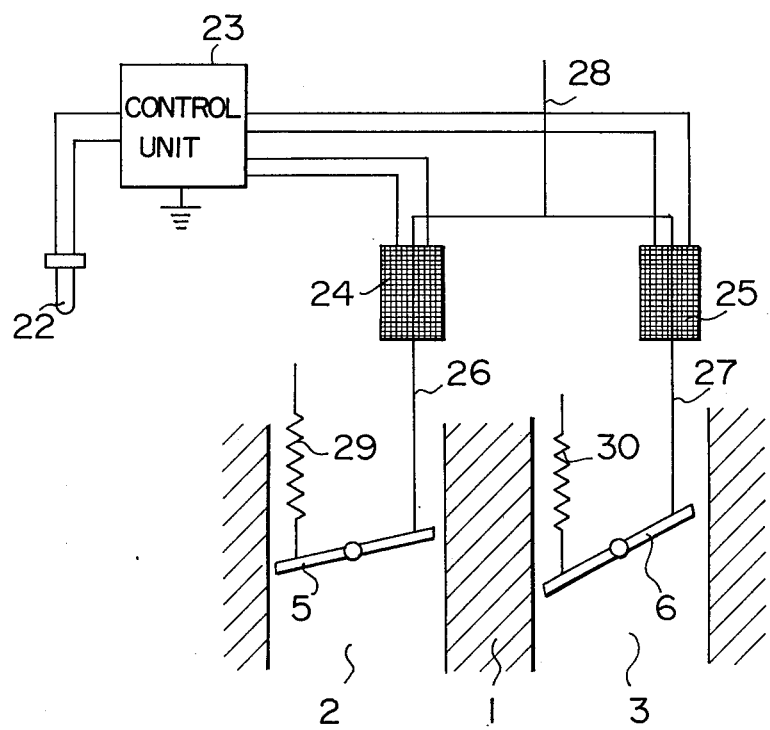
FIG. 6 is a diagrammatic view illustrating only the essential parts of a third embodiment of the present invention.
Figure 7:
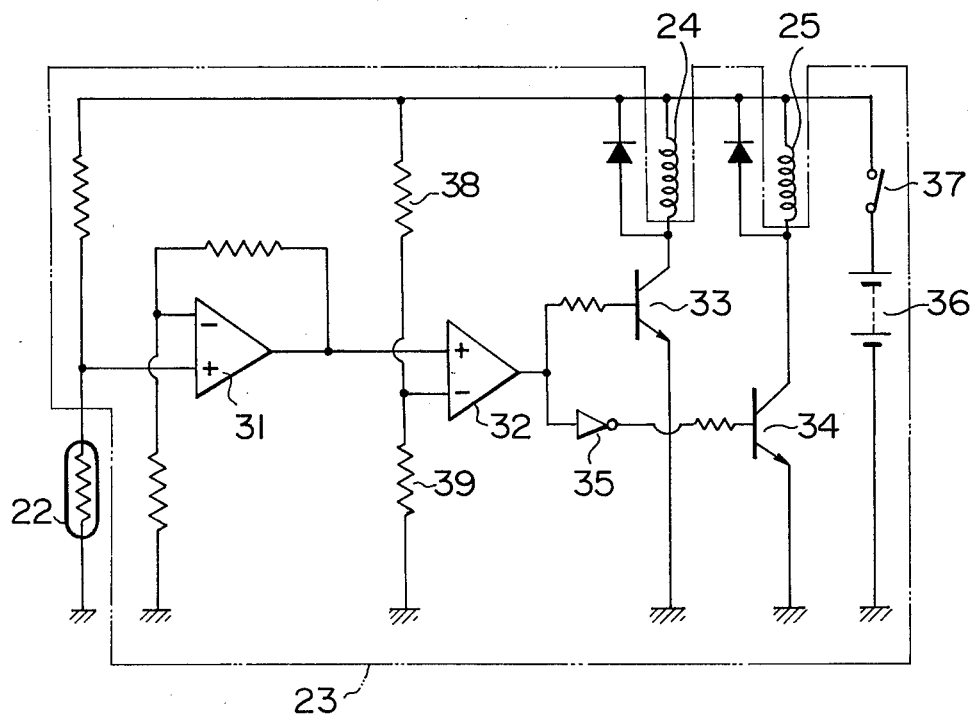
FIG. 7 is a circuit diagram of a control unit unit thereof.

Third Embodiment, FIGS. 6 and 7

In the third embodiment of the present invention shown in FIGS. 6 and 7, the main and auxiliary carburetors 2 and 3 (having similar constructions to those shown in FIG. 1) are substantially similar in construction so that the mixtures produced by both carburetors 2 and 3 are equal in volume and air-fuel ratio. Therefore the main and auxiliary intake passages (not shown) have the same cross sectional area. Furthermore, the throttle valves 5 and 6 of the carburetors 2 and 3 are controlled not only in response to the change in load of the internal combustion engine but also in response to the change in temperature of the internal combustion engine due to the changing operating conditions.

Referring to FIG. 6, a temperature sensor 22 such as a thermistor or thermocouple is so arranged as to sense the temperature of the cooling water of the internal combustion engine, the temperature of the air-fuel mixture or the temperature of the catalyst 20 or 20' in case of the second embodiment. The output signal of the sensor 22 is transmitted to a control unit 23 which compares the temperature detected by the sensor 22 with a reference temperature. Actuators 24 and 25 are actuated in response to the output signals from the control unit 23. Any suitable actuators may be employed, but in the instant embodiment the solenoids are used as the actuators 24 and 25. The solenoids 24 and 25 may be of course of the conventional type consisting of a coil and an armature, but the stroke of the armature is relatively longer and when the coil is not energized, the armature is moved away from the coil while when the coil is energized, the armature enters into the coil and is moved together with the latter. The control unit 23 is so arranged that when the temperature detected by the sensor 22 is lower than a reference temperature, it gives the output signal to the solenoid 25 to energize it. However, when the detected temperature is higher than a reference temperature, the solenoid 24 is energized. The armatures of the solenoids 24 and 25 are coupled to the throttle valves 5 and 6, respectively, through wires 26 and 27, respectively, while the coils are coupled through a wire 28 to the accelerator pedal (not shown). The throttle valves 5 and 6 are loaded with return springs 29 and 30, respectively, so that the throttle valves 5 and 6 are normally biased to be completely closed.

The circuit diagram of the control unit 23 is shown in detail in FIG. 7. The control unit 23 comprises an inverting amplifier 31, a comparator 32, transistors 33 and 34, an inverter 35, a power source 36, and a key switch 37. The comparator 32 compares the reference value which is determined by the ratio between the resistances of resistors 38 and 39 with the output signal of the thermistor 22 which is amplified by the inverting amplifier. In response to the output signal from the comparator 32, either of the transistors 33 or 34 is conducted to permit the current to flow from the power source 36 into the solenoid 24 or 25. When the sensor 22 is so arranged as to sense the temperature of the fuel-air mixture, a reference temperature is about 100°C while the sensor 22 detects the temperature of the catalyst 20 or 20', a reference temperature is about 850°C. When the engine is started or warmed up so that the temperature of the cooling water, the fuel-air mixture or catalyst is lower than a reference temperature, the solenoid 25 is energized with the solenoid 24 remained de-energized. As a result the wires 27 and 28 are operatively coupled to each other while the wires 25 and 27 are disconnected so that the throttle valve 5 in the main carburetor 2 is completely closed by the return spring 29. Consequently, the main carburetor 2 and the main intake passage (See FIG. 1) are closed, but the throttle valve 6 in the auxiliary carburetor 3 is controlled by the accelerator to control the volume of the mixture flowing from the auxiliary carburetor through the auxiliary intake passage into the combustion chamber (See FIG. 1). Thus, only the mixture produced in the auxiliary carburetor 2 is charged into the combustion chamber 12. Since the mixture supplied from the auxiliary carburetor 3 is heated by the exhaust gases as described hereinbefore in conjunction with the first and second embodiments, the atomized fuel particles in the mixture are vaporized.

When the temperature detected by the sensor 22 becomes higher than a reference temperature as the engine is warmed up, the solenoid 25 is de-energized while the solenoid 24 is energized so that the throttle valve 6 of the auxiliary carburetor 3 is completely closed and remains in this position under the force of the return spring 30 while the throttle valve 5 in the main carburetor 2 is operatively coupled to the accelerator pedal. As a result, only the mixture produced in the main carburetor 2 is charged into the combustion chamber 12 through the main intake passage 7. The mixture supplied from the main carburetor 2 is not so highly heated, but since the temperature of the engine is sufficiently raised, the evaporation of the atomized fuel particles in the mixture is facilitated. Furthermore the overheat of the mixture by the exhaust gases may be prevented.

In one modification of the third embodiment, additional valves may be interposed in the main and auxiliary intake passages 7 and 8, respectively, and be operatively coupled to the solenoids 24 and 25 instead of the throttle valves 5 and 6. In this case, instead of two carburetors 2 and 3, only one carburetor may be used. Furthermore, the opening degrees of the valves (i.e. the cross sectional areas of the intake passages) may be controlled in an analog manner.

As described hereinbefore, according to the first embodiment of the present invention, the efficient, positive and complete evaporation of the atomized fuel particles may be ensured while the overheating of the mixture may be prevented. Therefore, the optimum mixture distribution among the cylinders of a multicylinder engine may be ensured, thus resulting in the optimum combustion, without causing the decrease in intake efficiency. According to the second embodiment of the present invention, the quick, positive and complete evaporation of the atomized fuel particles may be ensured. In addition to the features and advantages of the first embodiment, the third embodiment of the present invention has a further advantage in that the abnormal temperature rise of the mixture may be positively prevented.

What is claimed is:

1. An intake system for intercommunicating carburetor means and combustion chamber means of internal combustion engines comprising: a cylinder head, intake port means provided in said cylinder head, intake valve means provided in said intake port means, exhaust pipe means, at least two intake passage means joined in that part of said intake port means which is immediately before said intake valve means, one of said intake passage means passing through said exhaust pipe means, and an oxidation catalyst disposed in that part of one said intake passage means which is within said exhaust pipe means.

2. An intake system as defined in claim 1, wherein said oxidation catalyst is an oxidizing catalytic metal carried by a honey-comb shaped carrier.

3. An intake system as defined in claim 1, wherein said oxidation catalyst is composed of catalyst particles disposed within a case, said case having walls provided with a plurality of small holes.

4. An intake system for intercommunicating carburetor means and combustion chamber means of internal combustion engines comprising: a cylinder head, intake port means provided in said cylinder head, intake valve means provided in said intake port means, exhaust pipe means, at least two intake passage means joined in that part of said intake port means which is immediately before said intake valve means, one of said intake passage means passing through said exhaust pipe means, an enlarged evaporation chamber means provided at that part of one said intake passage means which is within said exhaust pipe means, and an oxidizing catalyst disposed in said evaporation chamber means.

5. An intake system as defined in claim 1, wherein one of said intake passage means which passes through said exhaust pipe means is supplied with a rich mixture, and the other intake passage means is supplied with a lean mixture.

6. An intake system as defined in claim 1, further comprising means for controlling the flow rate of mixture flowing through each of said intake passage means in response to the operational condition of the engine.

7. An intake system as defined in claim 6, wherein each of said intake passage means has the same cross-sectional area and is supplied with mixture having the same air-fuel ratio, and said control means comprises valve means disposed within each of said intake passage means, a sensor for detecting temperature indicating operating condition of the engine and a control unit operable to compare the detected temperature with a reference temperature and to control said valve means according to the detected temperature, whereby when the detected temperature is higher than the reference temperature, the opening degree of the valve means in one of said intake passage means which passes through said exhaust pipe is reduced, whereas when the detected temperature is lower than the reference temperature, the opening degree of said valve means is increased.

* * * * *